UNITED STATES PATENT OFFICE.

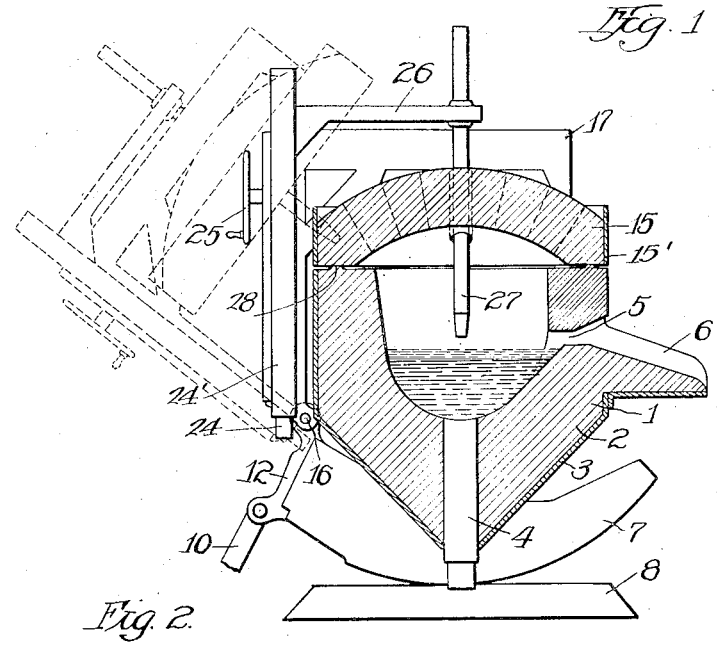
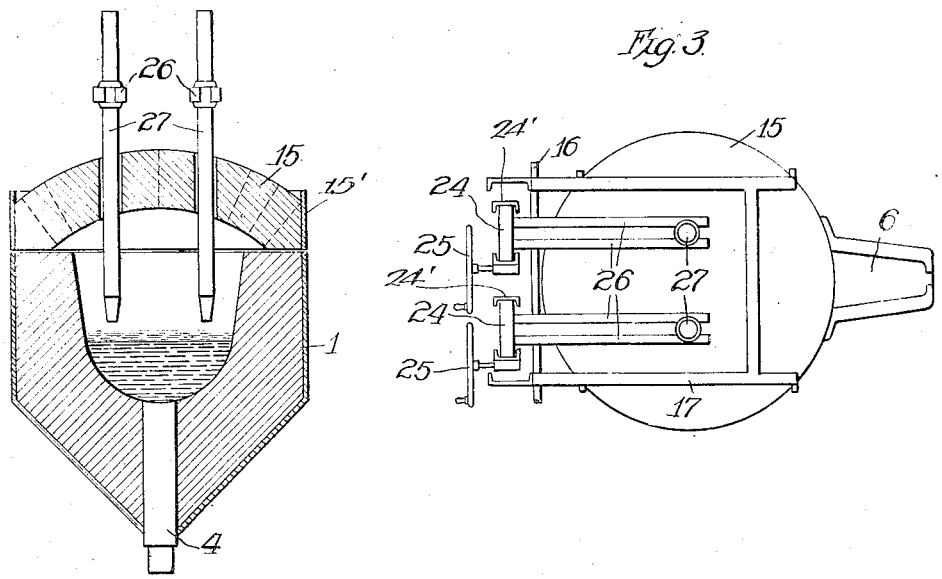
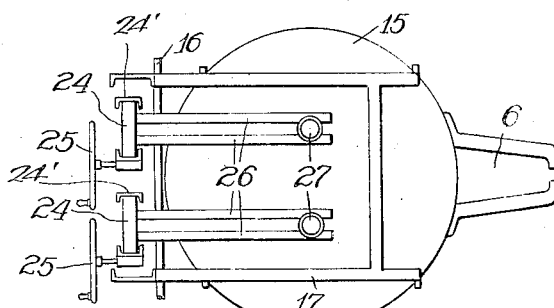

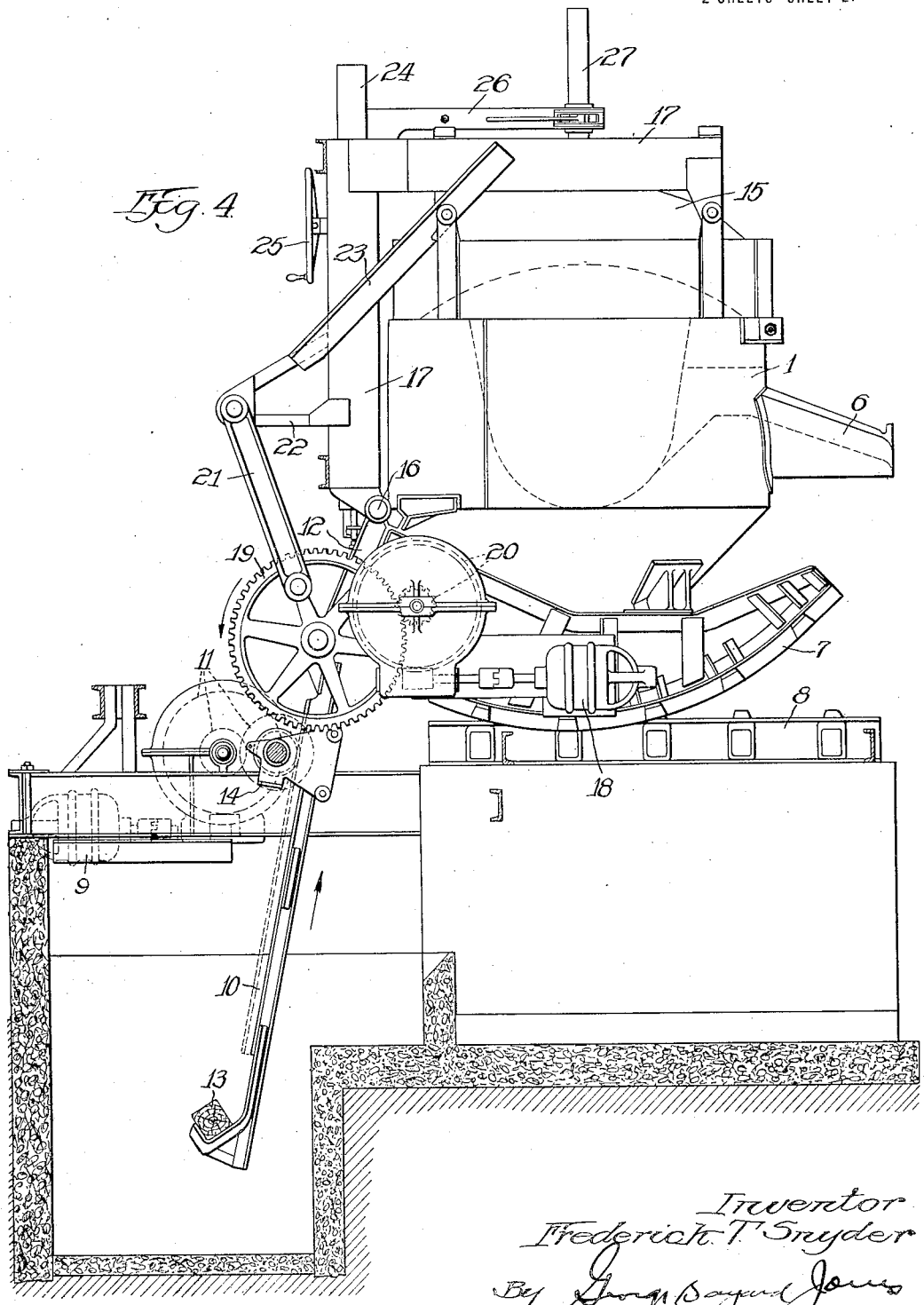

FREDERICK T. SNYDER, OF OAK PARK, ILLINOIS, ASSIGNOR TO INDUSTRIAL ELECTRIC FURNACE COMPANY, OF CHICAGO, ILLINOIS, A CORPORATION OF INDIANA.

ELECTRIC FURNACE.

1,325,539.     Specification of Letters Patent.     Patented Dec. 23, 1919.

Application filed March 1, 1917. Serial No. 151,720

*To all whom it may concern:*

Be it known that I, FREDERICK T. SNYDER, a citizen of the United States, residing at Oak Park, in the county of Cook and State of Illinois, have invented a certain new and useful Improvement in Electric Furnaces, of which the following is a full, clear, concise, and exact description.

This invention relates to improvements in electric furnaces and more particularly to a new and improved type of roof adapted for use in connection therewith.

As is well known, the making of good quality steel is largely dependent upon the exclusion of oxygen from the steel during the melting process. It has been customary in the past to construct electric furnaces with one or more charging ports, which extend radially into the furnace and which are provided with doors mounted on the exterior circumference of said furnace. It has been difficult in actual practice to make the joints between these doors and the outer metallic shell of the furnace air tight, by reason of the fact that if said joints are made of metal in contact with metal, as is commonly the case, they soon warp, due to the intense heat of the furnace, and permit air to leak into the melting chamber thereof. If, on the other hand, these joints are made of some plastic material, such as fire clay, the heat soon cracks and breaks the same, which also results in air leakage, which slows down and delays the deoxidation of the steel.

One object of the present invention is to provide an electric furnace, which shall be so constructed as to reduce to a minimum air leakage and hence the oxidation of the metal during the melting process to thereby afford means whereby steel may be made much faster than is possible in furnaces as now commonly constructed. Another object of the invention is the provision of an electric furnace wherein the use of side charging ports together with the doors heretofore used in connection therewith, are dispensed with, said furnace being provided with a roof adapted to form, with the top of the furnace body, a horizontal gas tight joint, said roof being provided with means whereby the same may be tilted back out of engagement with said body portion to permit of said furnace being charged.

A further object of the invention resides in the provision of a plurality of electrodes and one bottom contact in connection with a furnace of the type described, said electrodes projecting through the roof of said furnace and being supported in such manner as to tilt back and forth therewith.

Other objects and advantages will be apparent from the following description, taken in connection with the accompanying drawings, wherein the preferred embodiment of the invention is illustrated.

Figure 1 is a vertical section taken through a furnace provided with my improvements.

Fig. 2 is a vertical section illustrating the relative positions of the electrodes and bottom contact.

Fig. 3 is a top plan view of the structure illustrated in Fig. 1; and

Fig. 4 is a side elevation.

Referring more in detail to the drawings, the body of the furnace is shown at 1 and is provided with the usual refractory lining 2 and the outer metallic shell 3. The bottom contact of the furnace is shown at 4. A suitable tap hole 5 is provided whereby the contents of the furnace may be poured when the melting operation has been completed. The spout 6 coöperates with said outlet 5 to facilitate in this pouring operation. It will be noted from the drawings that the tap hole 5 is the only opening in the body of the furnace, the charging doors heretofore used in connection with furnaces of this type being dispensed with, that said opening is a comparatively small one and that it is near the level of the molten bath.

The body of the furnace is preferably mounted on a plurality of rockers 7 shown diagrammatically in Fig. 1 and more in detail in Fig. 4. Suitable structural members 8 are provided beneath the furnace to receive the rockers 7, said rockers coöperating therewith to enable the body of the furnace to be tilted at an angle in order that the molten metal contained within said furnace may be poured therefrom through said tap hole. Suitable operating mechanism is provided to rock the furnace forward to its discharging position and to provide means whereby the same may be returned to its operative position, said means being shown in the drawings in the form of a suitable motor 9 which is adapted to tilt the body of the furnace forward as above described, by means of the rack 10 and suitable reduction gearing 11, said rack being connected to one end of the rockers 7 by means of the casting 12. A suitable bumper 13 is mounted on the lower end of the rack and is adapted to limit the tilting movement of the furnace by engagement with the stop 14.

It will be noted from Fig. 1 of the drawings, that the body of the furnace is open at its upper end and is provided with a roof 15 adapted to be swung or tilted out of engagement therewith, in the manner hereinafter pointed out, to permit of said furnace being recharged through the top thereof. Pivotally mounted on the shaft 16, the opposite ends of which are journaled in the upper ends of the casting 12, and provided with an overhanging portion, which is rigidly connected to the roof 15, is a suitable crane 17. Suitable operating mechanism is provided and is adapted to coöperate with the crane 17 to oscillate the same about its pivot, to thereby swing or tilt the roof 15 back out of engagement with the top of the furnace body to a position substantially as indicated in dotted lines in Fig. 1. The roof is constructed preferably of a plurality of refractory blocks or bricks, having the form of an arch and held together by a suitable band or abutment 15'. These details of the roof construction are made the subject matter of my Patent 1,100,995, June 23, 1914.

In Fig. 4 one form of operating mechanism to effect the tilting of the roof is shown and comprises a suitable motor 18 which drives the gear wheel 19 by means of the reduction gearing 20. Said gear wheel 19 is connected with the crane 17 by the rod 21, which is pivotally mounted at one end to a suitable bracket 22, rigidly secured in any suitable manner to said crane 17. The rod 21 is eccentrically mounted on the gear wheel 19. A suitable reinforcing member 23 is bolted or otherwise secured to the roof 15 at one end, the other end thereof being rigidly connected to the upper end of the bracket 22, substantially as shown. It will be noted from this that as the gear wheel 19 is rotated in the direction of the arrow, (Fig. 4), by means of the motor 18 and the reduction gearing 20, the crane, together with the roof 15, will be swung back substantially as shown in Fig. 1, thereby permitting easy access to the melting chamber of the furnace for the purpose of recharging the same. The mechanism for tilting the body of the furnace to its discharging position and subsequent operative position and the mechanism for tilting the crane 17 and the roof 15 of the furnace, are independent of one another. In other words, the roof 15 may be tilted regardless of the position of the body of the furnace, the reverse being also true. Preferably, the pivotal support for the crane 17 is mounted parallel to the axis of rotation of the body of the furnace.

It will be noted that the pivotal support for the roof is considerably below the top of the furnace. The advantage in having a low pivot is that the furnace may be uncovered by moving the roof through a comparatively small angle. If the roof is tilted back through a considerable angle, the stresses on the roof bricks increase and if the roof is tilted back too far, the arch may collapse. My construction permits of the roof being tilted back far enough to clear the body of the furnace without requiring it to be tilted at a dangerous angle. Furthermore, when the roof is tilted back at a small angle, the heat reflected from the roof is directed back into the furnace instead of out toward the furnace operator. This not only enables the operators to work more effectively near the furnace, but it also increases the efficiency of the furnace by conserving the heat.

After the roof 15 has been swung back out of engagement with the top of the body of the furnace, and the recharging operation has been completed, it is preferred to place a quantity of dry powder, which is not melted by the heat used, around the upper edge of the body of said furnace in the form of a ridge 28. Sand may be used for this purpose. The roof 15 is then returned to its normal position and firmly presses the powder between the abutting surfaces of said roof and the body of the furnace substantially as shown in Fig. 1, to thereby produce a gas-tight joint which effectively prevents any air from leaking into the furnace. This gas tight joint thus formed, is not, as above pointed out, affected by the heat of the furnace. Therefore, the only opening into the furnace, after the same has been charged and the roof thereof brought into position, is the small outlet port 5. Air cannot pass through this port however, after the melting operation has been started, by reason of the fact that the gases generated within the furnace are emitted therefrom and burn on the exterior of the furnace. Accordingly, it will be noted that oxidation of the metal within the furnace is reduced to a minimum. The heat produced by the gases burning in the spout 6 at the mouth of the tap hole 5. heats said spout to a sufficient degree to prevent the formation of a "skull" therein by the steel when it is poured.

It will be noted from the foregoing, that the only joint provided in the furnace is that between the roof and the body portion thereof, and that this joint is a substantially horizontal one in contrast to the vertical joints heretofore necessitated by the use of doors to close the side charging ports. A horizontal joint, such as herein illustrated, may be made gas tight and retained in such condition much more easily than a vertical joint, in view of the fact that the sealing material has no tendency to fall out of a horizontal joint under the influence of gravity. Furthermore, it will be noted that a furnace has been provided which is adapted to be charged through the top after the removal of the roof thereof and that accordingly, much larger pieces of scrap or ore may be charged into the body of the furnace, than has heretofore been possible in furnaces constructed with the more or less restricted charging ports.

Mounted intermediate the uprights of the crane 17, are provided a plurality of members 24, which are adjustable vertically within suitable guides 24' by suitable hand operating means 25. Extending out over the roof 15 of the furnace from each of these members 24, are a plurality of parallel arms 26, between which are clamped the electrodes 27 of the furnace. The structure hereinafter described provides two electrode supporting cranes which are not only parallel, but which are comparatively close to each other. The advantage of this close, parallel arrangement is that when the current passes through the two electrodes in series, the inductance of the circuit through the two cranes is reduced to a minimum. The electrodes are mounted vertically as shown and project through suitable openings in the roof 15 into the melting chamber of the furnace. It is preferred to provide two of these electrodes and to mount the same, together with the bottom contact 4, in the same plane. These electrodes, are so mounted as to move with the crane and the roof 15, when the same are tilted to the dotted line position shown in Fig. 1. In other words, the electrodes remain in their operative positions with reference to the roof, while the roof 15 is tilted to permit of a recharging of the furnace. It will thus be seen that as soon as the roof has been returned to its normal position, the furnace is again ready to be operated, without any subsequent replacing of the electrodes.

The provision of two electrodes adapted to coöperate with the bottom contact affords means whereby a polyphase electric current may be used in connection therewith. The mounting of the electrodes 27 and the bottom contact 4 in the same plane, provides means whereby a maximum separation is obtained between the electrodes, while at the same time leakage of current between the electrodes through the roof of the furnace is reduced to a minimum. Preferably, the plane within which the electrodes and the bottom contact 4 are mounted, is parallel with the axis of rotation of the body of the furnace, and to the pivotal support for the crane 17. This construction has its advantages in that the electrodes in this position will clear the adjacent wall of the body of the furnace, when the roof 15 is swung back out of engagement therewith, more readily than would be the case if the electrodes were otherwise mounted.

While one form of operating mechanism has been herein illustrated and described, for tilting the roof of the furnace, it is obvious that various other forms of tilting and rocking mechanism may be devised to accomplish the desired result, and applicant does not wish therefore to be limited to the particular construction illustrated except where limitations appear in the appended claims.

Having thus described my invention, what I claim as new and desire to secure by Letters Patent of the United States is:

1. An electric furnace comprising a body portion, and a roof, said roof comprising a plurality of refractory members with reinforcing means holding said members in contact, and supporting means permitting said roof to be moved into and out of engagement with said body portion.

2. An electric furnace, comprising a body portion, a roof, means for removing said roof by moving it bodily and tilting it through a small angle, and means for sealing said roof on said furnace.

3. An electric furnace comprising a body portion, means to oscillate said body portion, a roof comprising refractory blocks in the form of an arch with means comprising an abutment for said arch, and means to tilt said roof, said roof tilting means being independent of said oscillating mechanism.

4. An electric furnace comprising an oscillating body, and a tilting roof on the top thereof.

5. An electric furnace comprising an oscillating body, a tilting roof on the top thereof and a vertical electrode passing through said roof.

6. An electric furnace comprising an oscillating body, a tilting roof on the top thereof, and means whereby said roof may be tilted independently of said body.

7. An electric furnace comprising an oscillating body, a roof hinged near the bottom thereof and adapted to tilt out of and into engagement therewith, the axis of rotation of said body being arranged parallel to the axis about which said roof tilts.

8. The combination with an electric furnace, of a roof hinged thereto, and a vertical electrode passing through said roof and arranged to move with said roof about the hinge thereof.

9. An electric furnace, comprising a body open at the top, a roof adapted to cover said body, and means for moving said roof about an axis located below the plane of the joint between said body and said roof.

10. An electric furnace, comprising a body portion, a roof adapted to cover said body portion, a frame supporting said roof, said frame being mounted to tilt with respect to said body and an electrode projecting through said roof and adjustably supported on said frame.

11. In combination, an electric furnace, a frame mounted thereon, means for moving said frame with respect to said furnace, a roof for said furnace and an electrode crane, both supported by said frame, whereby said roof and said crane are caused to move together.

12. In combination, an electric furnace, a frame mounted thereon, means for moving said frame with respect to said furnace, a roof for said furnace and an electrode crane, both supported by said frame, whereby said roof and said crane are caused to move together, and means for altering the position of said electrode with respect to said roof and said electrode crane.

13. The combination with an electric furnace, of a frame adapted to move about an axis outside of said furnace, a refractory roof supported by said frame and an electrode supported by said frame and adapted to move through said roof into contact with a bath within said furnace.

14. An electric furnace, comprisng a container for a bath, a roof for said container, an electrode projecting through said roof, and means whereby said roof can be moved about an axis below the surface of said bath whereby such movemnt operates to withdraw the lower end of said electrode from said bath.

15. The combination in an electric furnace, of a roof composed of refractory bricks, a band holding said bricks together, a frame supporting said band at distributed points, and means for moving said frame with said band and said roof to open said furnace.

16. An electric furnace, comprising a body, a removable roof, and means for sealing the space between the walls of said body and said roof consisting of a ring of sand having a pyramidal cross section placed upon the walls of said body, the point of said pyramidal section being flattened by the pressure of said roof.

17. The combination with an electric furnace, of a supporting rocker therefor, a frame hinged to said rocker, hangers associated with said frame for supporting the roof of the furnace, said roof comprising a band and refractory material confined thereby.

18. The combination with an electric furnace, of a supporting rocker therefor, a frame hinged to said rocker, hangers associated with said frame, a crane adjustably mounted on said frame, a roof band supported by said hangers, an arch of refractory material supported by said band and an electrode supported by said crane, and projecting through said roof.

19. An electric furnace, comprising a plurality of electrodes, a bottom contact, said electrodes and said contact being in the same plane, and arms carrying said electrodes and extending at right angles to said plane to facilitate movement of said electrodes.

20. An electric furnace comprising a body portion, a roof adapted to cover said body portion and a frame supporting said roof, said frame and said roof being mounted to tilt with respect to said body portion.

21. The combination in an electric furnace, of a roof composed of refractory material, a band surrounding said material, a frame supporting said band at a plurality of points, and means for moving said frame with said band and said roof to open said furnace.

22. The combination in an electric furnace, of a roof composed of refractory material, a reinforcing member for said material, a frame attached to said member, and means for moving said frame whereby said roof may be lifted from said furnace to thereby open the same.

23. An electric furnace comprising a tilting body, a removable roof, an electrode passing through said roof, and means supporting said roof and said electrode, a part of said supporting means constituting the electrical conductors of said electrode.

24. The method of charging and sealing an electric furnace comprising a body portion, a roof, and a melting chamber, which consists in tilting said roof back out of engagement with said body portion, thereby permitting unobstructed access to said melting chamber, introducing a charge into said melting chamber through the top thereof, placing pulverized material around the upper wall of said body portion, and then causing the roof to be swung back into position, thereby pressing said powder between the abutting surfaces of said roof and said body portion to form a horizontal gas tight joint.

25. The improved process of making steel which consists in melting a charge by means of an arc in a furnace, which is air tight except for a small discharge outlet, entrance of air at said outlet being prevented by issuing gases.

26. The process of making steel in an electric arc furnace which consists of removing the roof and the electrode associated therewith, introducing a charge of scrap into the melting chamber of said furnace through the top thereof, replacing said roof and said electrode, and establishing an arc between said electrode and the scrap to melt the latter.

27. An electric furnace comprising a body with a melting chamber, a roof removable to permit charging, an adjustable electrode projecting through said roof, means for supporting said roof and said electrode, and electrical connections to said electrode, said connections being maintained during the removal of said roof.

In witness whereof, I, hereunto subscribe my name this 23rd day of February, A. D. 1917.

FREDERICK T. SNYDER.